Figure 1:
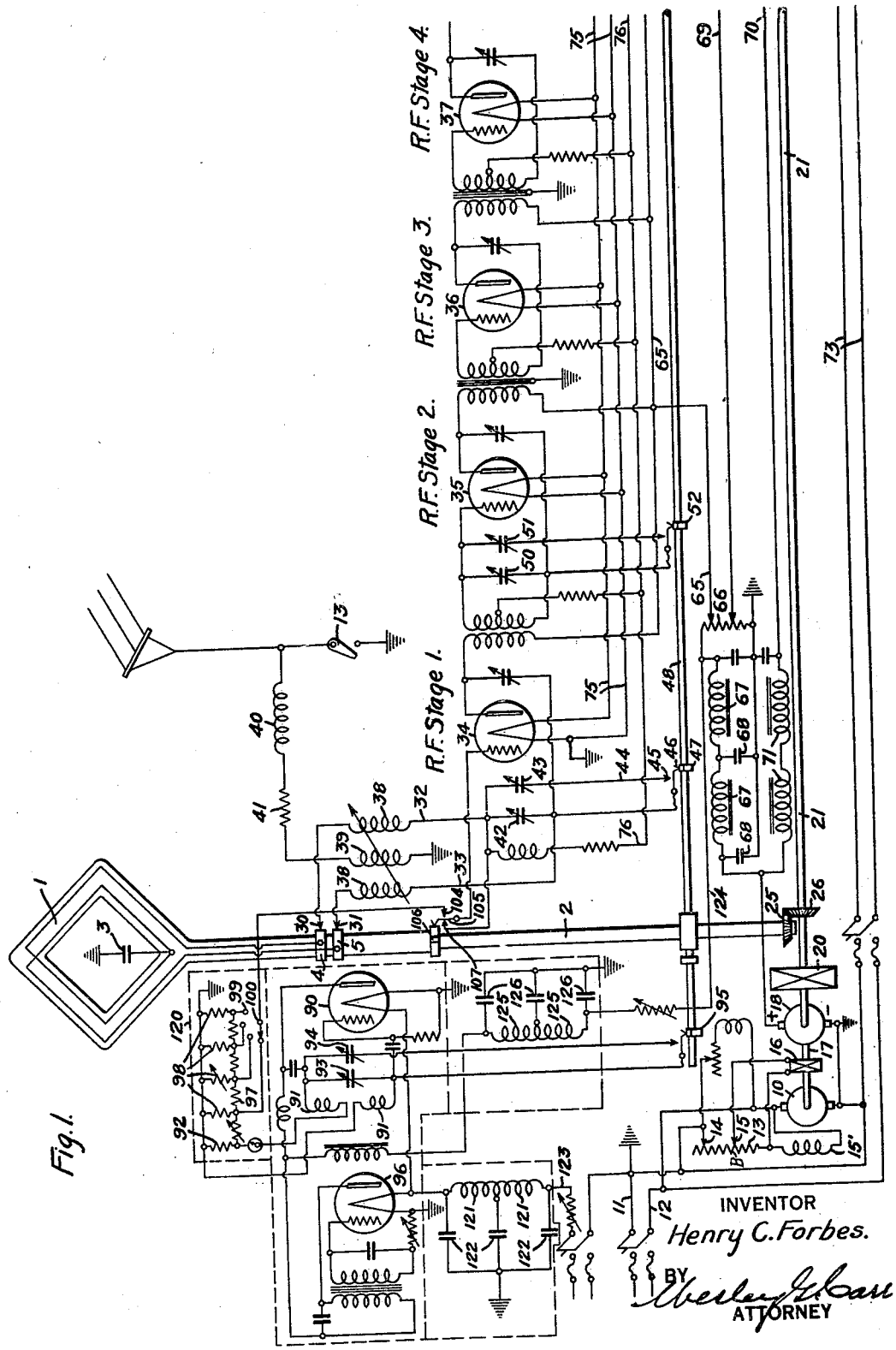

June 16, 1931.  H. C. FORBES  1,809,967
RADIANT ENERGY RECEIVING SYSTEM
Filed Feb. 15, 1929  2 Sheets-Sheet 1

INVENTOR
Henry C. Forbes.
BY
ATTORNEY

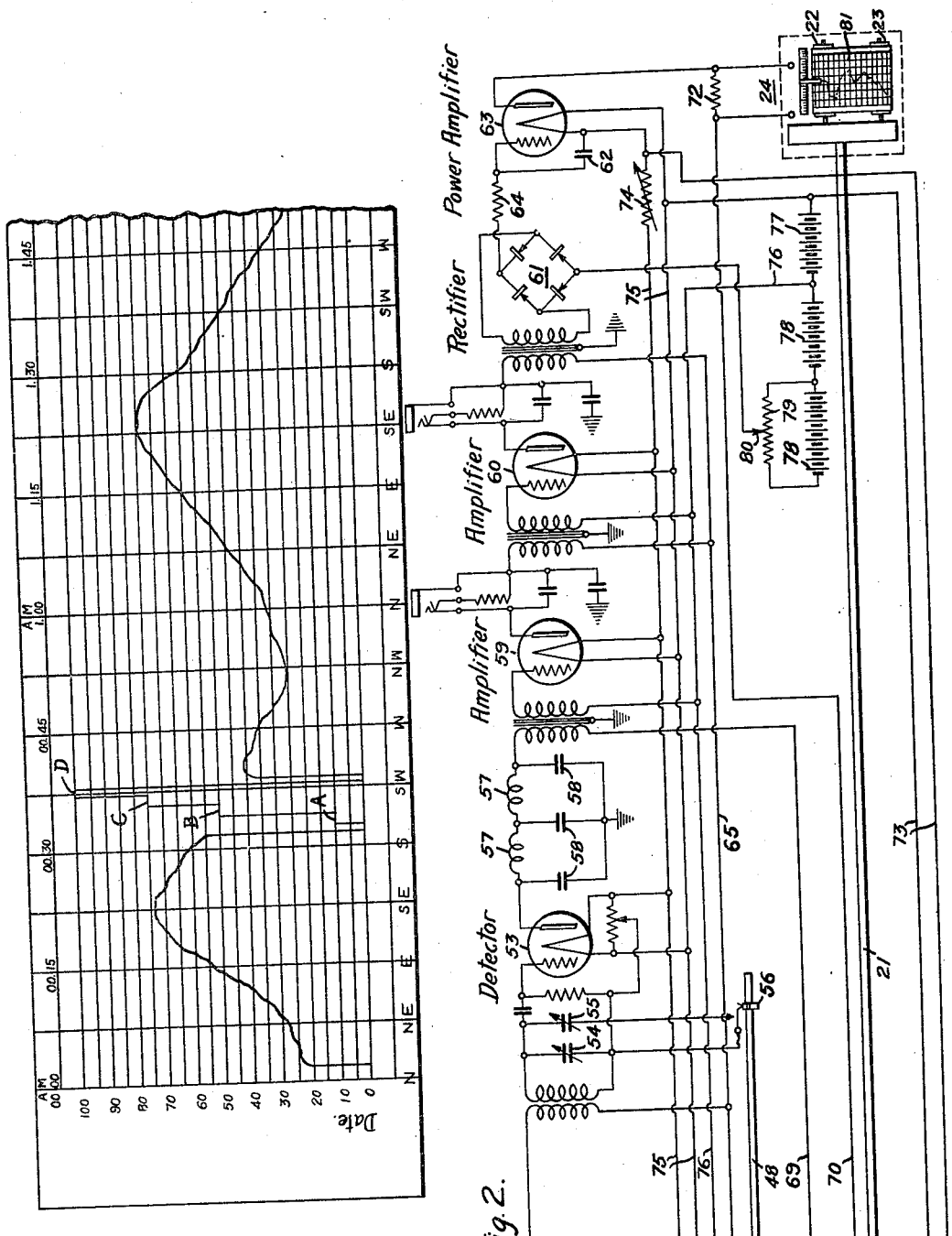

Patented June 16, 1931

1,809,967

UNITED STATES PATENT OFFICE

HENRY C. FORBES, OF SPRINGFIELD, MASSACHUSETTS, ASSIGNOR TO WESTINGHOUSE ELECTRIC & MANUFACTURING COMPANY, A CORPORATION OF PENNSYLVANIA

RADIANT ENERGY RECEIVING SYSTEM

Application filed February 15, 1929. Serial No. 340,256.

My invention relates to radiant-energy receiving systems, and it has particular relation to systems whereby a continuous record may be made of intensity of atmospheric electrical disturbances of the type commonly known as "static", and of the direction from which the disturbances are received.

It has recently become evident, from a careful comparison of data from many geographically separated points, that the intensity and character of static disturbances is definitely related to weather conditions. The data has heretofore been mainly obtained by the voluntary cooperation of numerous observers, ordinary radio-receiving apparatus being utilized therefor. Such data, however, while it is valuable as an indication of the intensity of static disturbances, has not previously been sufficiently comprehensive to enable the accurate prediction of static-center movements, nor has it included accurate records of average static field-strength intensity in micro-volts per meter.

It is, accordingly, an object of my invention to provide a receiving system that shall automatically make a continuous record of static disturbances.

Another object of my invention is to provide a receiving system that shall make a continuous record of static disturbances and shall include an indication of the direction from which the static was received.

Another object of my invention is to provide a receiving system that shall give a continuous record of the time of day or night at which static is prevalent.

Another object of my invention is to provide a receiving system that shall make a continuous record of the average intensity of static disturbances, expressed in micro-volts per meter, at the location of the receiving antenna.

Another object of my invention is to provide a receiving system that shall automatically record the direction and intensity of static disturbances on any one of a plurality of frequencies.

Another object of my invention is to provide, in a receiving system of the type described, means for automatically interpolating into the static-record, at definite intervals, calibration marks from which the average intensity of the recorded static impulses, in equivalent micro-volts per meter, may be determined.

Another object of my invention is to provide, in a receiving system of the type described, means whereby a static-record taken at one location may be directly compared with a static record taken at another location without the necessity of calculation.

Another object of my invention is to provide means whereby the bearings of static-centers may be simultaneously recorded automatically at a plurality of points, thus enabling the movement of such centers to be followed with great accuracy.

Another, and more specific, object of my invention is to provide a receiving system of the type described that shall require minimum attention after having once been calibrated and set into operation.

A preferred commercial embodiment of my invention comprises a loop-antenna so disposed with respect to an ordinary open antenna as to give a heart-shape reception diagram. The loop is rotated continuously by a constant-speed motor at a speed of two revolutions per hour. The output from the loop is fed through a radio receiving set comprising a plurality of radio-frequency amplifying stages, a detector, and a plurality of audio-frequency amplifying stages.

The output from the audio-frequency amplifier is rectified, and the unidirectional current-pulses are utilized to reduce a normally high negative charge applied to the grid of an amplifying tube to a value depending upon the magnitude of the average amplitude of the static. The plate current of the amplifying tube which, consequently, increases with increase in average static amplitude, is utilized to operate a recording device comprising a continuous tape that advances at a speed corresponding to the speed of rotation of the loop-antenna.

A plurality of cam-operated switches are provided, whereby the tuning of the loop-antenna and the radio-frequency amplifier are simultaneously so altered that static, during any one revolution of the loop-antenna, is received at a frequency differing from the frequency of reception during the loop-revolution immediately preceding. For practical purposes, two frequency-changes have been found sufficient, although more may be used, if desirable.

A local source of modulated oscillations is also provided for automatic calibration of the receiving system in terms of equivalent volts-per-meter of field strength, a plurality of cam-operated switches being utilized to periodically connect the said source to the input circuit of the system and to automatically vary the amplitude of the output from the source when so connected.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which:

Figs. 1 and 2 together constitute a diagrammatic view of a complete static recording system comprising a preferred embodiment of my invention.

Fig. 3 is a view of a portion of a static-record.

The apparatus illustrated in Fig. 1 of the drawings comprises a loop-antenna 1 rotatably supported in a vertical position upon a standard 2. The electrical center of the loop is connected to ground through a large condenser 3, and the terminals of the loop are connected to slip-rings 4 and 5 mounted upon, and encircling the standard 2.

Motive power for rotating the loop is supplied from a shunt-wound motor 10. The motor is supplied with current from a source (not shown) over a plurality of conductors 11 and 12, and a rheostat 13, provided with two contact arms 14 and 15, is serially connected with the field winding 15'. The contact arm 14 of the rheostat is utilized to adjust the motor to the desired running speed. That portion of the rheostat which is included between the contact arm 15 and the field winding is connected in circuit with a centrifugal control-device 16 mounted upon the shaft 17 of the motor, which device functions to short circuit the said portion of the rheostat in the event that the speed of the motor 10 falls below normal.

A high potential generator 18 is mounted upon the motor-shaft 17, for the purpose of supplying plate potential for the entire receiving system.

The common shaft of the motor-generator is connected through a speed-reduction gear 20 to a main shaft 21, which shaft is, at its farther end, connected through suitable gearing, to a plurality of record-tape supporting and driving rolls 22 and 23 comprised in a continuous recording device 24.

Rotary motion is transmitted from the main shaft 21 to the loop-supporting standard through a plurality of intermeshing gears 25 and 26, mounted on the standard and shaft, respectively.

A plurality of collecting brushes 30 and 31 are associated, respectively, with the slip rings 4 and 5 carried by the loop-standard, and connections 32 and 33 extend from these brushes to the input terminals of a radio-frequency amplifier comprising a plurality of thermionic tubes 34, 35, 36 and 37 of any desired type.

Each of the connections between the brushes and the radio frequency amplifier comprises an inductor 38. A third inductor 39 is serially included in circuit between the ground and an open antenna, and is supported in inductive relation to the inductors 38. By properly proportioning the three inductors, by adjusting the mutual inductance thereof, and by properly adjusting an inductor 40 and a resistor 41 in the antenna circuit, the desired heart-shape reception diagram may be obtained.

A tuning condenser 42 is connected permanently in shunt to the input terminals of the first radio-frequency amplying stage, and one terminal of a second condenser 43 is permanently connected to one of the terminals of the said tuning condenser. A connection 44 extends from the opposite terminal of the second-mentioned condenser to a fixed contact member 45 with which is associated a movable contact member 46 that is so disposed as to be actuated by a cam 47 mounted upon a counter shaft 48. The counter shaft is rotated, through suitable gearing, from either the main shaft or the loop supporting standard, the latter method being the one illustrated. The rotation of the cam 47, therefore, causes the contacts 45 and 46 to close, thus periodically connecting the condenser 43 in shunt to the permanently connected tuning condenser 42 at predetermined intervals.

The second radio-frequency amplifying stage, comprising the thermionic device 35, is also provided with a permanently connected tuning condenser 50 and an insertable condenser 51 that is controlled by a cam 52, mounted upon the countershaft.

The output from the second radio frequency stage is further amplified in a plurality of untuned radio frequency amplifying stages, comprising the thermionic devices 36 and 37, respectively, and is then impressed across the input terminals of a detector stage comprising a thermionic device 53. The detector stage is provided with a permanently connected tuning condenser 54, and with an insertable tuning condenser 55 that is controlled by a cam 56 mounted upon the countershaft.

The output from the detector stage is passed through a filter comprising a plurality of inductors 57 and shunting condensers 58 and is impressed across the input terminals of an audio-frequency amplifier comprising a plurality of thermionic tubes 59 and 60.

The output from the audio frequency amplifier is impressed across a rectifier bridge 61 and the rectified current is utilized to charge a large condenser 62 that is connected between the grid and filament of a power-amplifier tube 63. A resistor 64 is interposed between the bridge 61 and the condenser 62.

Plate potential for all of the radio-frequency amplifying stages and for the audio-frequency amplifying stages is supplied over a conductor 65 which is connected to an intermediate point on an output resistor 66 that is connected in shunt relation to the terminals of the high potential generator 18. A filter, comprising a plurality of inductors 67 and a plurality of shunting condensers 68, is interposed between the positive terminal of the high potential generator and the positive end of the resistor in order that "commutator ripple" may be minimized.

Plate potential for the detector tube 53 is supplied over a conductor 69 which leads from a point on the output resistor intermediate the negative end thereof and the point thereon from which potential is supplied, over the conductor 65, for the amplifying stages.

The power-amplifier tube 63 is supplied with plate potential directly from the positive terminal of the high potential generator over a conductor 70, the actuating winding (not shown) of the recording device 24 and a plurality of choke-coils 71 being serially included in the supply circuit. The actuating winding of the recorder is protected against unduly high currents by a shunting resistor 72.

Filament potential for all of the amplifying tubes comprised in the recording system is supplied over a plurality of conductors 73 from the same source that energizes the constant-speed motor 10. A resistor 74 is interposed between the power-amplifier tube and the remaining tubes, in one of the filament supply conductors 75, in order that a lower filament voltage may be applied to these tubes than is supplied to the said power-amplifier.

Each of the radio frequency and audio frequency amplifying stages is supplied with grid biasing potential, over a common conductor 76, from a biasing battery 77, the positive terminal of the battery being connected to the common filament-potential supply conductor 73.

In order that the grid of the power-amplifier tube 63 shall be supplied with a higher negative bias than the remaining amplifying tubes, an additional biasing battery 78 is interposed between the said grid and the negative terminal of the first-mentioned biasing battery 77.

A portion of the battery 78 is preferably shunted by a resistor 79, with which is associated a movable contact device 80 that is connected to the grid of the amplifier tube 63, whereby the potential thereof may be accurately adjusted to the cut-off point. The rectifying bridge 61 and the resistor 64 are included in the circuit between the contact device 80 and the grid of the tube 63.

The recording instrument, which may be a device known as "Westinghouse type R recorder", or which may be of any other well known type, comprises the aforementioned rotatable rolls 22 and 23, one of which accommodates the unused portion of a record-tape 81 and the other of which serves to wind up the tape as fast as it is fed from the storage roll.

Motive power for the rolls is supplied from the main shaft 21, as previously described, in order that the tape shall, at all times, be caused to advance at a speed proportional to the speed of rotation of the loop. The reason for this proportionality will be apparent from an inspection of Fig. 3, from which figure it will be noted that the tape is calibrated, not only in time, but also according to the points of the compass. The record, therefore, indicates both the amplitude of the static disturbances at all times as well as the direction from which the static is being received.

In the operation of my system, as described, the static impulses are amplified at radio-frequency, are reduced to audio-frequency by the detector, are amplified at audio frequency in the audio-frequency amplifying stages and are then converted into unidirectional pulses by the rectifying bridge. It will be noted from an inspection of the drawing that the bridge is so arranged that, whenever an alternating potential is impressed across the input terminals thereof, a unidirectional current will flow in the resistor 64 toward the grid of the power amplifier tube 63 and toward the condenser 62. The flow of this current tends to place a positive charge upon the grid of the tube and upon the plate of the condenser 62 connected thereto. Since it is desired to obtain a record of average static conditions, rather than of individual pulses of static, the charging resistor 64 and the grid-potential controlling condenser 62 are so chosen as to have a time-constant of approximately 20 seconds. A resistor having a magnitude of one megohm and a condenser of twenty micro-farads capacity have been found to be satisfactory.

Each group of static impulses, therefore, reduces the normal negative potential applied to the grid of the power amplifier tube from the biasing battery 77—78, and permits an increase in the output or plate current. A definite portion of the increased current flow, passing through the recording device, causes the pen or other marking instrument to move relative to the zero line on the tape, and to thus make a record of the average static amplitude.

It is highly desirable that the static amplitude record shall be such as to be easily understandable without the necessity of mathematical calculations. In order that this result may be obtained, I have found it expedient to periodically introduce known voltages into the receiving system, the said voltages being such as to produce calibration marks on the record that are, at once, readable in terms of field-equivalent micro-volts-per-meter of field-strength at the receiving antenna. The continuous static record, therefore, may be at once construed in equivalent micro-volts-per-meter of static strength at the receiving antenna merely by comparing it visually with the calibration markings.

The apparatus that I have found best suited for supplying the calibrating potentials consists of an oscillation-generator comprising a thermionic tube 90 that is provided with an output circuit serially including a plurality of inductors 91 and a resistor 92. The output circuit is tuned by a condenser 93, permanently connected in shunt thereto and a second condenser 94 is so disposed with respect to the said permanently connected condenser that it may periodically be connected in shunt therewith through the action of a cam 95 mounted upon the countershaft 48. The tuning of the oscillation generator may thus be changed simultaneously with the tuning of the loop and the tuning of the radio frequency amplification stages of the receiver.

Inasmuch as the static recorder is responsive only to impulses at audio frequency, the oscillation-generator 90 is so associated with an audio-frequency oscillation-generator comprising a thermionic tube 96 that radio-frequency potentials modulated at audio-frequency shall be developed across the resistor 92. These circuits, by means of which the audio frequency oscillations are generated and by means of which they are utilized to modulate the oscillator, are conventional and form no part of the present invention.

The resistor 92 in the output circuit of the oscillator is connected across the input terminals of an attenuating device comprising a plurality of series resistors 97 and a plurality of shunt resistors 98. Each of the series resistors is connected to a fixed contact point 99, and a movable contact device 100, actuated through suitable gears (not shown) from either the main shaft or the countershaft, is associated with the said point. The movable contact device 100 is connected to a fixed contact member 104 that is normally disassociated from a movable contact device 105 so disposed as to be actuated by a cam 106 mounted upon the loop supporting standard. The contact member 105 is directly connected to the grid of the thermionic tube 34 comprised in the first radio-frequency amplifying stage, and is normally in engagement with a fixed contact device 107 that, in turn, is connected through one of the inductors 38 to one of the loop-terminals. The rotation of the cam 106, therefore, periodically disconnects the radio frequency amplifier from the loop and connects it to the output terminals of the attenuator, instead.

During the time that the amplifier is connected to the output terminals of the attenuator by reason of the deflection of the movable contact member 105, the actuating mechanism for the contact device 100, associated with the attenuator causes the said contact device to move successively to engage the several contact points 99 and to thus place a series of predetermined potentials across the input terminals of the amplifier.

The rate of actuation of the contact device 100 associated with the attenuator is so chosen that the time required for a complete series of four calibrating potentials is approximately 3 minutes.

The manner in which the calibrating markings appear on the record is clearly indicated by the points A, B, C and D in Fig. 3.

By reason of the fact that the attenuator may be so preadjusted as to permit the impression of any desirable series of potentials across the amplifier input terminals, it should be apparent that the said points A, B, C, and D may be easily made to correspond to the several values of field-strength, in equivalent volts-per-meter at the loop, that are most convenient for calibrating the static-record.

It is highly important that stray potentials from the oscillation generator be prevented from affecting the receiver, except during the intervals when the attenuator is purposely connected thereto and, for that reason, I have enclosed the oscillator-modulator system and the attenuator in a compartmented metallic container indicated by a dotted line 120.

I have also interposed a filter-system, comprising a plurality of inductors 121 and shunting condensers 122 in a conductor 123 which supplies filament potentials for the oscillator and modulator tubes, the filter-system being also enclosed within a separate compartment of the metallic container.

Plate-potential for the oscillator and modulator tubes is derived from the output resistor 66 over a conductor 124, and a filter-system, comprising a plurality of inductors 125 and shunting condensers 126, is interposed between the tubes and the resistor 66 to serve the double purpose of preventing commutator-ripple from reaching the oscillator and modulator tubes and for preventing high frequency oscillations from getting back into the resistor and being, consequently, impressed upon the several amplifying stages of the receiver proper.

A static recording system constructed and arranged according to my invention is mainly advantageous in that the record obtained thereby is directly readable without the necessity of calculation or interpolation. At the same time, the record gives a continuous indication of the time at which the static occurs, the direction from which static is being received, as well as the average amplitude thereof in micro volts-per-meter at the receiving antenna. It is, accordingly, quite feasible to install a plurality of such systems at geographically separated points and to thus obtain a plurality of records from which the direction and rate of travel of static-centers can be immediately plotted. The movement of static centers may, therefore, be correlated with weather conditions and may be utilized in weather forecasting. In some instances it may be desirable to obtain more accurate bearings on static centers than can be obtained by the hereinbefore described apparatus and, in such event, a cam-operated switching device 130 may be provided for grounding the overhead antenna during every other revolution of the loop-antenna. When the overhead antenna is grounded the static will be recorded as coming, with equal strength, from two diametrically opposite points of the compass, and the actual bearing can then be determined from an inspection of the record with the antenna ungrounded, by reason of the fact that the maxima are sharper in the figure 8 reception diagram.

Although I have illustrated and described only one specific embodiment of my invention, numerous modifications thereof will be apparent to those skilled in the art to which it pertains. My invention, therefore, is not to be limited except insofar as is necessitated by the prior art or by the spirit of the appended claims.

I claim as my invention:

1. In combination, a directional energy-receiving device, and means for continuously indicating the direction from which energy is being received and the average amplitude of said energy.

2. In combination, a directional energy-receiving device, and means for making a continuous record indicating the time at which energy is received, the average amplitude of the received energy and the direction from which said energy is received.

3. In a signal-recording system, continuously rotatable energy-receiving means, amplifying means energized therefrom, and means for automatically changing the tuning of the receiving and amplifying means at pre-determined time intervals.

4. In a signal-recording system, energy-receiving means, means for deriving low-frequency alternating currents from received high-frequency energy, means for deriving low-frequency and uni-directional impulses from said low-frequency currents, and means for utilizing said uni-directional impulses for making a record of the average amplitude of said high-frequency energy.

5. In a signal-receiving system, energy-receiving means, amplifying means energized therefrom, and means for automatically calibrating said amplifying means at predetermined intervals of time.

6. In a signal-receiving system, energy-receiving means, amplifying means energized therefrom, a local source of calibrating oscillations, and means for automatically introducing energy from said source into said amplifying means at predetermined intervals of time.

7. In a signal-receiving system, energy-receiving means, amplifying means energized therefrom, a local source of calibrating oscillations, means for automatically introducing energy from said source into said amplifying means at predetermined intervals, and means for altering the amplitude of said energy during those periods when said energy is introduced into said amplifying means.

8. In a signal-recording system, energy receiving means, signal-recording means energized therefrom, and means whereby the average signal-amplitude may be immediately determined in micro-volts-per-meter from an inspection of the signal record.

9. In a signal-recording system, tunable energy receiving means, tunable amplifying means energized therefrom, a tunable local source of calibrating oscillations, and means for periodically altering the tuning of said receiving means, said amplifying means and said local source in unison.

In testimony whereof, I have hereunto subscribed my name this fourth day of February, 1929.

HENRY C. FORBES.